United States Patent [19]
Yanagawa et al.

[11] Patent Number: 6,100,955
[45] Date of Patent: *Aug. 8, 2000

[54] IN-PLANE FIELD TYPE LIQUID CRYSTAL DISPLAY DEVICE WITH DELTA ARRANGEMENT OF THREE PRIMARY COLOR PIXELS

[75] Inventors: Kazuhiko Yanagawa; Masuyuki Ohta; Kazuhiro Ogawa; Keiichiro Ashizawa; Masahiro Yanai, all of Mobara, Japan

[73] Assignee: Hitachi, Ltd., Tokyo, Japan

[ * ] Notice: This patent is subject to a terminal disclaimer.

[21] Appl. No.: 09/023,466

[22] Filed: Feb. 13, 1998

Related U.S. Application Data

[63] Continuation of application No. 08/692,524, Aug. 5, 1996, Pat. No. 5,760,857.

[30] Foreign Application Priority Data

Aug. 21, 1995 [JP] Japan ..................................... 7-211724

[51] Int. Cl.[7] .......................... G02F 1/136; G02F 1/1343
[52] U.S. Cl. .......................... 349/141; 349/109; 349/145
[58] Field of Search ............................... 349/42, 43, 106, 349/108, 143, 144, 145; 345/88, 92

[56] References Cited

U.S. PATENT DOCUMENTS

| 4,345,249 | 8/1982 | Togashi | 349/191 |
|---|---|---|---|
| 5,132,820 | 7/1992 | Someya et al. | 349/106 |
| 5,144,288 | 9/1992 | Hamada et al. | 349/145 |
| 5,598,285 | 1/1997 | Kondo et al. | 349/141 |
| 5,600,464 | 2/1997 | Ohe et al. | 349/123 |

FOREIGN PATENT DOCUMENTS

| 63-21907 | 5/1988 | Japan . |
|---|---|---|
| 5-505247 | 8/1993 | Japan . |

*Primary Examiner*—James A. Dudek
*Assistant Examiner*—Tai V. Duong
*Attorney, Agent, or Firm*—Antonelli, Terry, Stout & Kraus, LLP

[57] ABSTRACT

A so-called in-plane electric field type color liquid crystal display device employs the following configuration in order to minimize smear. Groups of row-direction arrayed unit pixels are staggered one-half pitch of the unit pixels from the adjacent row-direction arrayed unit pixel groups. Three adjoining unit pixels are selected from two adjacent row-direction arrayed unit pixel groups so that they straddle these two unit pixel groups, and the three selected adjoining unit pixels are assigned three primary colors respectively.

4 Claims, 9 Drawing Sheets

IN-PLANE FIELD TYPE LIQUID CRYSTAL DISPLAY DEVICE WITH DELTA ARRANGEMENT OF THREE PRIMARY COLOR PIXELS

CROSS REFERENCE TO RELATED APPLICATION

This is a continuation of U.S. application Ser. No. 08/692,524, filed Aug. 5, 1996 now U.S. Pat. No. 5,760,857, the subject matter of which is incorporated by reference herein.

BACKGROUND OF THE INVENTION (1) Field of the Invention

The present invention relates to a color liquid crystal display device and more particularly to a color liquid crystal display device generally called an in-plane field type.

(2) Description of the Prior Art

The color liquid crystal display device, generally called in-plane field type, has two transparent substrates arranged opposite each other with a liquid crystal layer interposed therebetween and also includes pixel electrodes, or display electrodes, and counter electrodes, or common electrodes arranged on the liquid crystal layer side of at least one of the two transparent substrates at locations corresponding to each unit picture element or pixel. In this construction, the color liquid crystal display device changes a light transmissivity or transmittance of the liquid crystal layer by an electric filed applied between the pixel electrode and the counter electrode whose component is almost parallel to the transparent substrate surfaces.

Such a color liquid crystal display device has come to be known for a wide viewing angle characteristics, a capability that enables a viewer to recognize images clearly even when he or she looks at the display surface from a wide viewing angle.

In a liquid crystal display device using the active matrix system, the unit pixels are respectively provided with switching elements. A counter voltage, which is a constant voltage or an AC voltage, is applied to the counter electrodes through a counter signal line common to a group of unit pixels arranged in a row direction. The pixel electrodes receive a video signal, which comes from a video signal line, common to a group of unit pixels arranged in a column direction, through the switching elements that are turned on by a scan signal from a scan signal line common to the row of unit pixels.

In this case, the scan signal lines, the video signal lines and the counter signal lines are all formed virtually linear and three adjoining unit pixels of a group arranged in the row direction (the direction in which the scan signal line extends) are assigned with three primary colors respectively.

That is, there adjoining unit pixels are regarded as a single unit pixel for color display.

Features of the in-plane field type liquid crystal display device have been disclosed in, for example, Japanese Application Publication No. Hei 5-505247 (PCT/WO91/10936), and Japanese Patent Publication No. 21907/1988 (JP-B-63-21907).

SUMMARY OF THE INVENTION

It has been found, however, that the color liquid crystal display device with the above configuration is apt to produce so-called smears.

Our investigation into this problem has produced the following findings.

While the pixel electrodes supplied with the video signal (voltage) should ideally produce, with respect to the counter electrodes, an electric field corresponding to the video signal, they also generate unwanted electric fields with respect to the counter electrodes because of the video signal lines arranged close to these electrodes. Smears resulting from such a phenomenon are called vertical smears, which have been found to become more salient as the intervals between the parallelly arranged video signal lines decrease.

Each of the counter signal lines extending in the row direction crosses a very large number of video signal lines running in the column direction with an interlayer insulation film interposed therebetween. Capacitance generated at these intersecting points and the resistances of the counter signal lines themselves cause the voltage waveform to be increasingly dull from the voltage supply end of the counter signal lines toward the other end, resulting in so-called horizontal smears.

The present invention has been accomplished under these circumstances and its objective is to provide a color liquid crystal display device capable of suppressing smears significantly.

Representative aspects of the present invention may be briefly summarized as follows.

The color liquid crystal display device of this invention comprises: opposing transparent substrates with a liquid crystal layer interposed therebetween; a pixel electrode and a counter electrode formed on the liquid crystal layer side of at least one of the transparent substrates in an area corresponding to each of unit pixels; scan signal lines each common to one group of row-direction arrayed unit pixels; switching devices turned on by a scan signal supplied to the associated scan signal line; video signal lines each common to one group of column-direction arrayed unit pixels and used to supply a video signal to the associated pixel electrodes; and counter signal lines each common to one group of row-direction arrayed unit pixels and used to apply a counter voltage to the associated counter electrodes; wherein a light transmittance of the liquid crystal layer is changed by an electric field generated between the pixel electrode supplied with the video signal and the counter electrode at the counter voltage, the electric field having components almost parallel to the transparent substrate surface; wherein the groups of row-direction arrayed unit pixels are each staggered one-half pitch of the unit pixels from the adjacent groups, and three adjoining unit pixels selected from adjacent groups of row-direction arrayed unit pixels so that they straddle these adjacent groups are assigned three primary colors respectively.

Because the color liquid crystal display device has the configuration described above, the three unit pixels function as a single combined color pixel. A predetermined number of combined color pixels are arranged in a row, and thus it is possible to reduce the number of unit pixels and therefore increase the interval between the adjacent video signal lines.

This allows the distance between the video signal line and the counter electrode in each of the unit pixels driven by the video signal line to be increased. This in turn makes it possible to suppress the electric field produced by the video signal line, the cause of the smear (vertical smear).

The reduction in the number of video signal lines reduces the capacitances produced at the intersections between the row-direction extending counter signal lines and the video signal lines. This in turn reduces the dullness of voltage waveforms of the counter signal line from the voltage supply end toward the other end, thus suppressing the smear (horizontal smear).

It is therefore possible to provide a color liquid crystal display device that can reduce the smear significantly.

The foregoing and other objects, advantages, manner of operation and novel features of the present invention will be understood from the following detailed description when read in connection with the accompanying drawings.

DESCRIPTION OF PREFERRED EMBODIMENTS

Preferred embodiments of the liquid crystal display device of this invention will be described with reference to the accompanying drawings.

First, the outline of the liquid crystal display device of the so-called in-plane field type, the subject of this invention, is explained.

Figure 2:
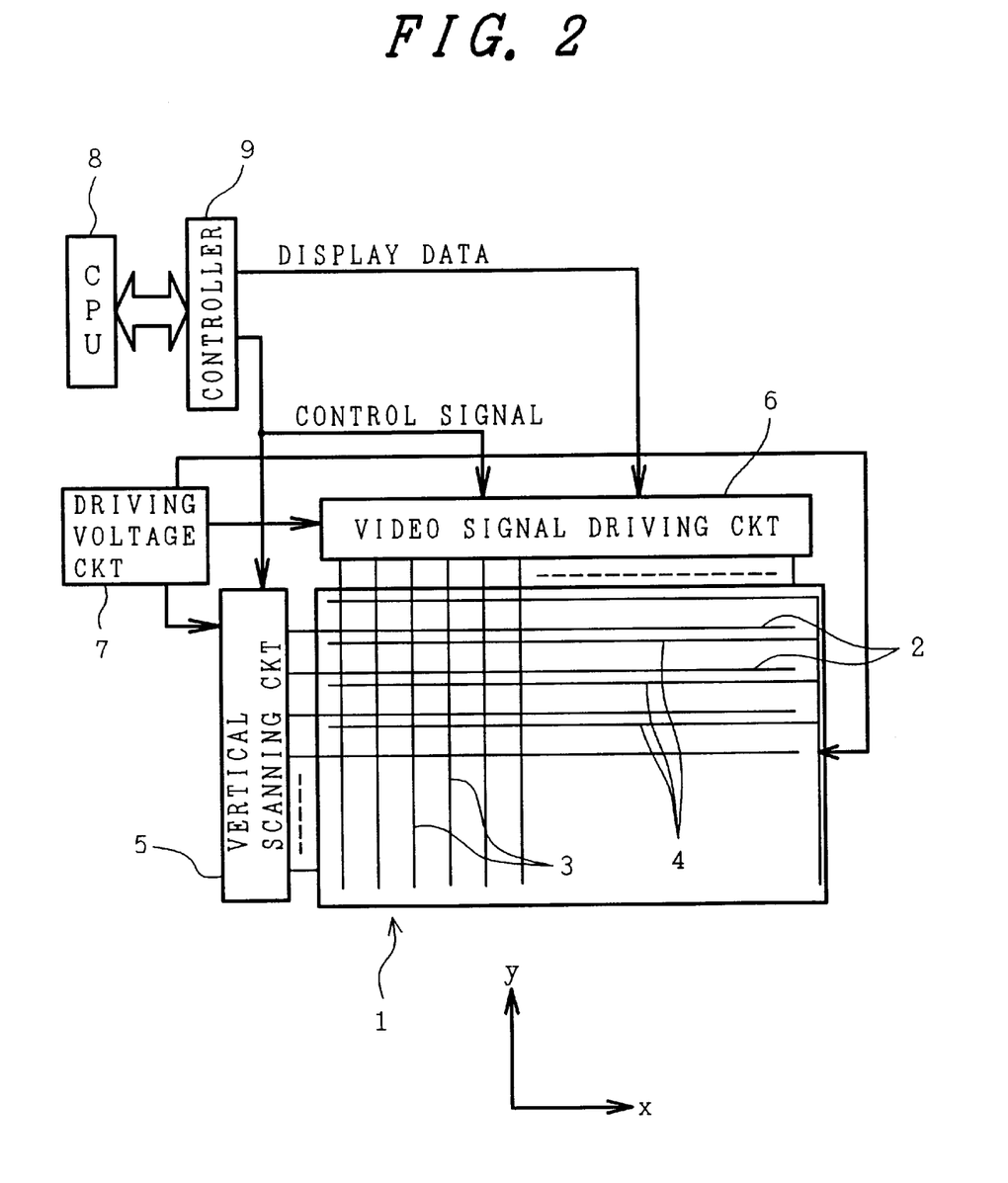
FIG. 2 is a schematic diagram showing the configuration of one embodiment of the drive circuit for the liquid crystal display device according to this invention.

Shown in FIG. 2 is a liquid crystal display device 1 which has two opposing transparent substrates with a liquid crystal interposed between. On the liquid crystal side of one transparent substrate 1A are formed scan signal lines 2 that extend in an x direction (row direction) and are arranged in a y direction (column direction). Isolated from the scan signal lines 2, video signal lines 3 extend in the y direction and are arranged in the x direction.

The video signal lines 3, though shown to be linear in the figure, may be formed meandering, as in other embodiment described later.

Rectangular areas enclosed by the scan signal lines 2 and the video signal lines 3 are where unit pixels are formed. These unit pixels are arranged in matrix to form a display surface.

The configuration of these unit pixels will be explained later. In the so-called in-plane field type, counter signal lines 4 each common for a group of unit pixels arranged in the x direction are provided and each of these counter signal lines 4 is connected to an AC voltage.

The counter signal lines 4 may also be provided on the liquid crystal side surface of another transparent substrate 1B opposite the transparent substrate 1A where the scan signal lines 2 are provided.

The liquid crystal display device 1 has a vertical scan circuit 5 and a video signal drive circuit 6 as external circuits. The vertical scan circuit 5 supplies a scan signal (voltage) successively to the individual scan signal lines 2. In synchronism with this timing, the video signal drive circuit 6 supplies a video signal (voltage) to the video signal lines 3 successively.

The scan signal lines 2 are connected to an AC voltage of the same amplitude as the counter signal lines 4 when the scan signal lines 2 are not selected.

The vertical scan circuit 5 and the video signal drive circuit 6 are supplied from a liquid crystal drive power circuit 7 and are also given image information from a CPU 8 through a controller 9 that divides the image information into display data and control signals.

The voltage applied to the counter signal lines 4 is also supplied by the liquid crystal drive power circuit 7.

Embodiments of the unit pixels used in the liquid crystal display device 1 of the above configuration will be described in the following.

Embodiment 1

Figure 1:
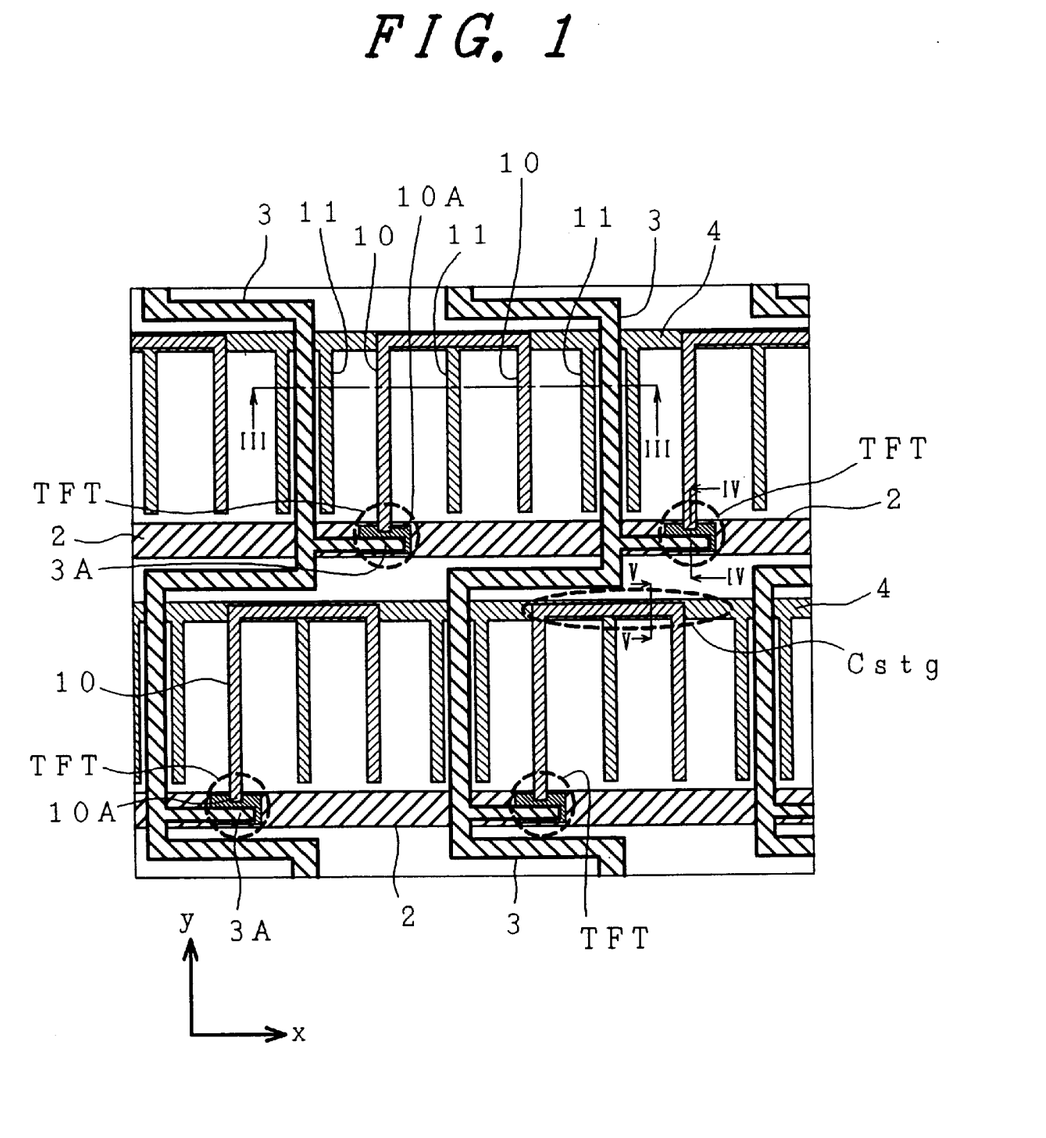
FIG. 1 is a plan view showing an essential portion of one embodiment of the liquid crystal display device according to the present invention.
Figure 4:
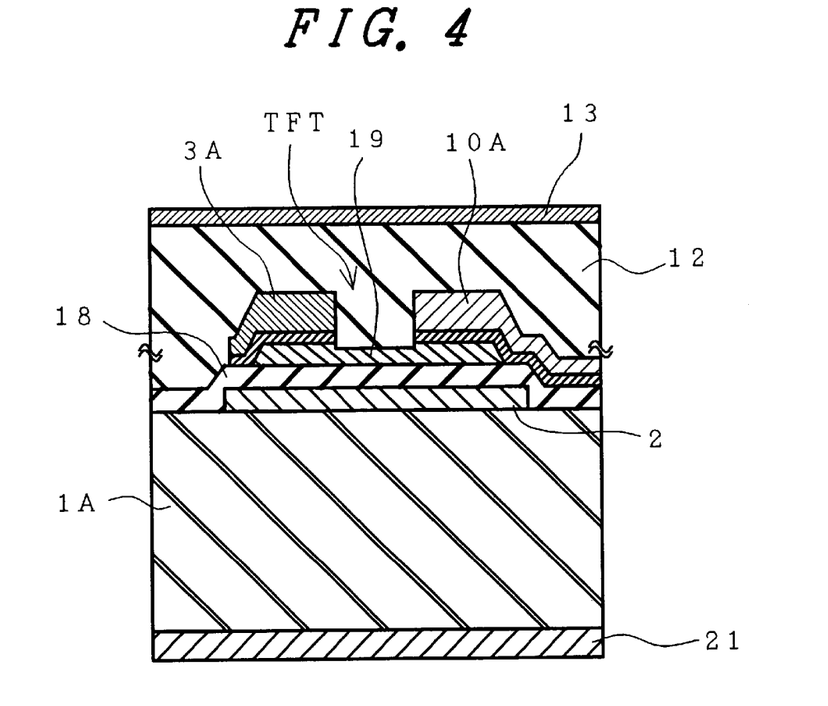
FIG. 4 is a cross section taken along the line IV—IV of FIG. 1.
Figure 5:
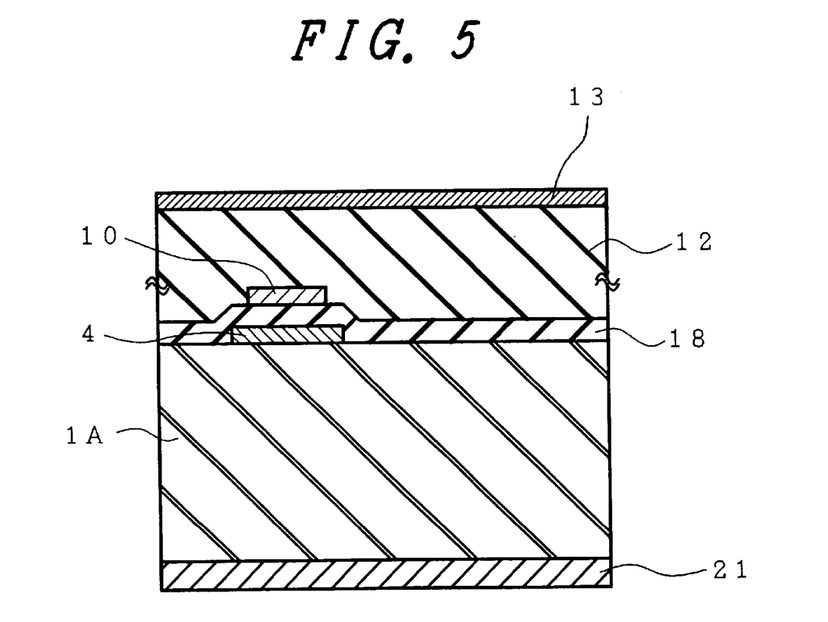
FIG. 5 is a cross section taken along the line V—V of FIG. 1.

FIG. 1 is a plan view showing the arrangement of the unit pixels on the transparent substrate 1A. A cross section taken along the line III—III of FIG. 1 is shown in FIG. 3; a cross section along the line IV—IV is shown in FIG. 4; and a cross section along the line V—V is shown in FIG. 5.

As shown in FIG. 1, on the main surface of the transparent substrate 1A there are formed linearly extending counter signal lines 4 and scan signal lines 2. These counter signal lines 4 and scan signal lines 2 are alternated with each other and arranged parallel to each other. The interval between a given counter signal line 4 and a scan signal line 2 located on the side of −y direction (on the lower side in the drawing) is set large, whereas the interval between the same counter signal line 4 and a scan signal line 2 located on the side of +y direction (on the upper side in the drawing) is set small.

Figure 3:
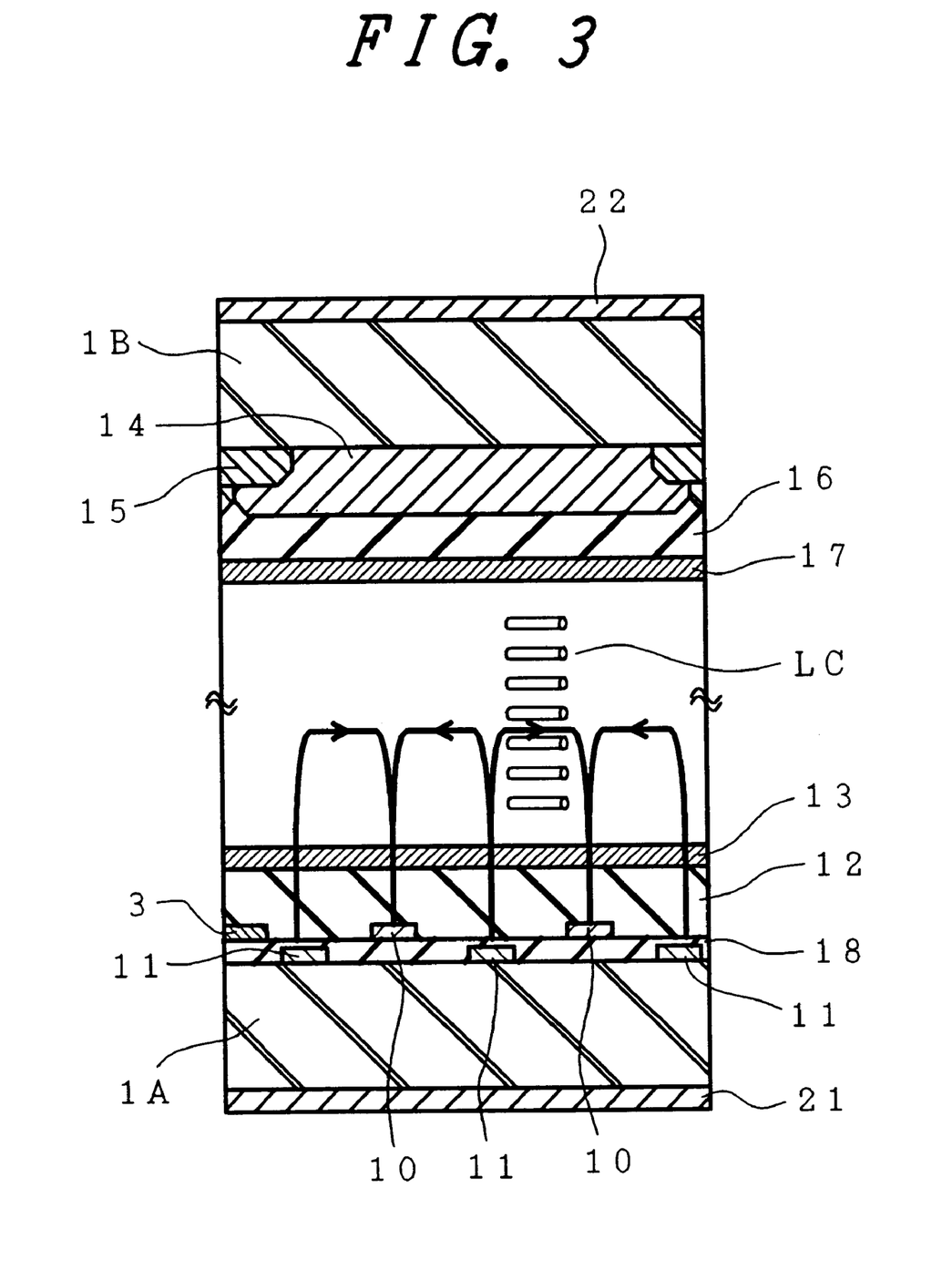
FIG. 3 is a cross section taken along the line III—III of FIG. 1.

An insulating film 18 is formed over a virtually whole area of the substrate covering the scan signal lines 2 and the counter signal lines 4 (see FIG. 3). Over this insulating film 18 are formed video signal lines 3 that extend in the y direction. That is, the insulating film 18 functions as an interlayer insulating film for the scan signal lines 2 and the counter signal lines 4 with respect to the video signal lines 3.

The adjoining video signal lines 3 are spaced at the same intervals and extend parallel to a counter signal line 4 in the x direction and then in the −y direction crossing the counter signal line 4 and scan signal line 2, after which they extend parallel to a scan signal line 2 in the −x direction and then in the −y direction crossing the counter signal line 4 and scan signal line 2. The video signal lines 3 extend in this zigzag manner.

Hence, in a case where regions enclosed by the largely-spaced counter signal lines 4 and scan signal lines 2 and by the adjacent video signal lines 3 practically constitute unit pixel areas, a group of unit pixels lined in the x direction is staggered one-half pitch of the unit pixels from the adjacent group of the x-direction arrayed unit pixels.

In the area of such a unit pixel, a thin film transistor TFT (enclosed by a dashed circle) is formed in a part of each scan signal line 2. The thin film transistor TFT is made of a MIS (Metal-Insulator-Semiconductor) transistor which turns on when a scan signal is supplied to the underlying scan signal line 2, with a part of the scan signal line 2 working as a gate of the transistor and the insulating film 18 as a gate insulating film.

A drain pad 3A of the thin film transistor TFT is formed integral with the video signal line 3 located on the −x direction side (on the left side in the figure) and a source pad 10A is formed integral with a pixel electrode 10.

The pixel electrode 10 extends from the source pad 10A in the +y direction and then runs in the +x direction over the counter signal line with the insulating film 18 interposed therebetween., after which it extends in the −y direction, forming a U-shaped contour.

Between the pixel electrodes 10 running in the y direction there is formed a counter electrode 11 that extends in the y direction. The counter electrode 11 is formed integral with the counter signal line 4 at a point under the insulating film 18.

The U-shaped pixel electrode 10 generates a storage capacitance Cstg (enclosed by a dashed ellipse in the figure) between its x-direction extending portion and the underlying counter signal line 4, with the insulating film 18 (which functions as a dielectric film) interposed between the pixel electrode and the counter signal line. The storage capacitance Cstg, when the thin film transistor TFT turns off, stores a video signal in the pixel electrode 10.

The surface of the transparent substrate 1A with the above construction is coated with a silicon nitride protective film 12, which is further covered with an orientation film 13 of polyimide (see FIG. 3).

In each of the unit pixels constructed in this way, when a scan signal is supplied to the scan signal line 2, the corresponding thin film transistor TFT is turned on to supply a video signal from the video signal line to the pixel electrode 10 through the drain pad 3A and source pad 10A of the thin film transistor TFT.

Since the counter electrode 11 opposing the pixel electrodes 10 is connected to AC voltage, an electric field with its components almost parallel to the main surface of the transparent substrate 1A is formed between these electrodes, changing the light transmittance of the liquid crystal disposed between them.

FIG. 3 is a cross section taken along the line III—III of FIG. 1 and illustrates the electric field E generated in the liquid crystal LC. In this cross section, the other transparent substrate 1B is shown assembled through the liquid crystal LC. On the liquid crystal side surface of the transparent substrate 1B in the area of the unit pixel is formed a color filter 14, which covers a part of a black matrix 15 that encloses the unit pixel area along the periphery. A protective film 16 is formed over the color filter 14 and the black matrix 15. Over the surface of the protective film 16 is formed an orientation film 17 made from polyimide.

Figure 6:
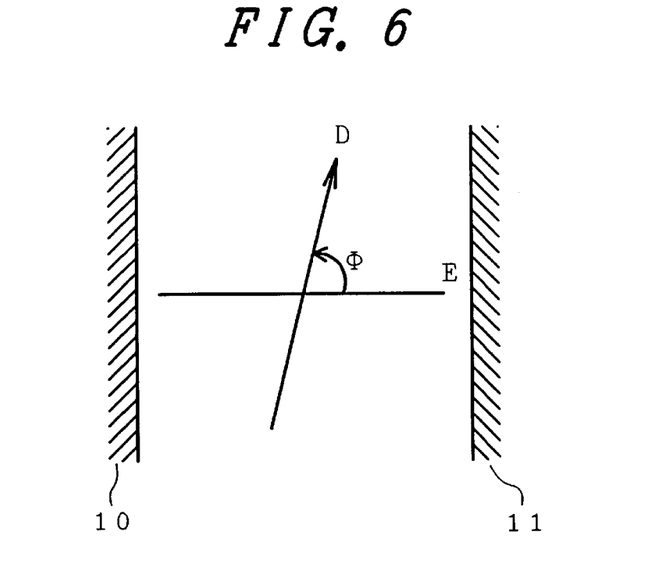
FIG. 6 is an explanatory diagram showing the relation between the direction of an electric field applied in the liquid crystal and the rubbing direction of the orientation film.

A gap between the opposing transparent substrates 1A and 1B is 4.1 pm, and the liquid crystal LC interposed between them is a nematic type that has a positive dielectric anisotropy $\Delta\epsilon$ of 7.3 (1 kHz) and a refractivity anisotropy $\Delta n$ of 0.073 (589 nm, 20° C.). FIG. 6 shows the rubbing direction of the orientation films 13, 17 with respect to the direction of the electric field E generated between the pixel electrode 10 and the counter electrode 11. The angle $\Phi$ between these directions is set at 85°. Further, as shown in FIG. 3, polarizing films 21, 22 are formed over the surfaces of the transparent substrates 1A, 1B on the side opposite the liquid crystal LC. The polarized light transmission axis of one of the polarizing films is parallel to the angle $\Phi$ of the rubbing direction of the orientation film and the polarized light transmission axis of the other polarizing film is perpendicular to the first axis.

FIG. 4 shows the cross section taken along the line IV—IV of FIG. 1. This is a cross section of the thin film transistor TFT that uses a part of the scan signal line 2 as its gate. Over a part of the scan signal line 2 is formed a semiconductor layer 19 of amorphous silicon, with the insulating film 18 interposed between. On the semiconductor layer 19, the drain pad 2A and the source pad 10A are formed, spaced from each other.

In this case, as explained earlier, the drain pad 3A is formed integral with the video signal line 3 and the source pad 10A with the pixel electrode 10.

FIG. 5 shows the cross section taken along the line V—V of FIG. 1, showing the storage capacitance Cstg formed between the pixel electrode 10 and the counter signal line 4, with the insulating film 18 as the dielectric film.

Figure 7:
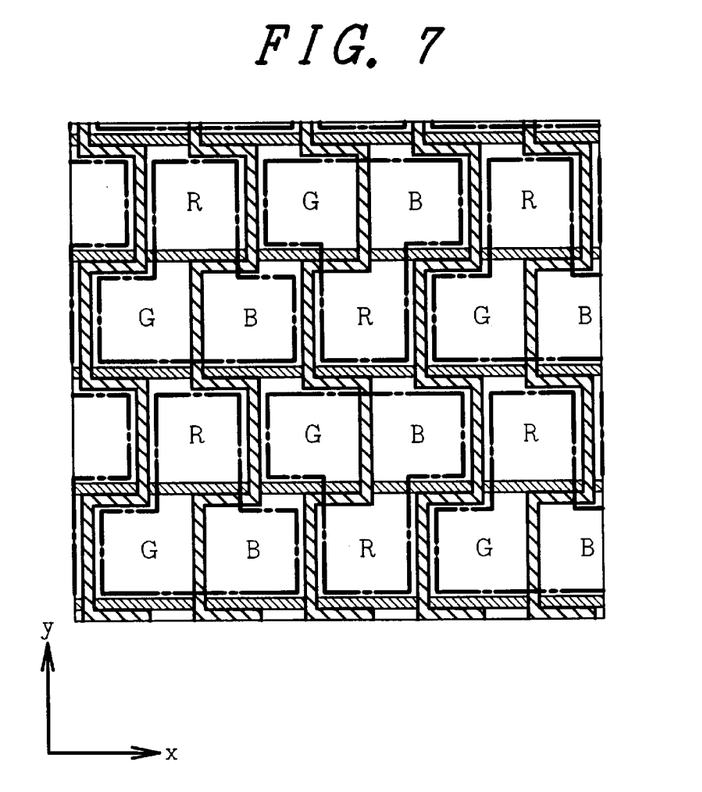
FIG. 7 is an explanatory diagram showing the arrangement of color filters in the configuration of FIG. 1.

FIG. 7 explains the use of colors of the color filters 14 that are formed on the transparent substrate 1B at locations corresponding to the unit pixels formed on the transparent substrate 1A, with the liquid crystal LC interposed between the two substrates.

In the figure, a unit pixel with a red (R) color filter in a given group of x-direction arrayed unit pixels, for example, works together with two adjacent unit pixels having green (G) and blue (B) color filters respectively that are included in the next x-direction arrayed unit pixel group, one row up or down in the figure, to form a single combined color pixel. That is, three adjoining unit pixels, which are selected from the adjacent groups of x-direction arrayed unit pixels so that they straddle these adjacent groups, are assigned three primary colors.

In vertical stripe configuration of prior art, for example, 10.4 inch diagonal display device has 640×3 unit pixels with 0.11 mm pitch in x-direction, and 480 unit pixels with 0.33 mm pitch in y-direction. In this configuration, a pitch in x-direction of a unit pixel is set one third of a pitch in y-direction.

However, in this embodiment of delta configuration, five inch diagonal display device has been realized by comprising 240 unit pixels with 0.423 mm pitch in x-direction, and 234 unit pixels with 0.319 mm pitch in y-direction. To be more specific, the display image is still good and well recognizable even if a pitch in x-direction of a unit pixel is set more than one third of a pitch in y-direction. This feature of the display image is especially suitable for television or navigation usage. In general, a pitch in x-direction of a unit pixel is set equal to a pitch in y-direction, or within ±60% of a pitch in y-direction.

With the liquid crystal display device of the above embodiment, because a predetermined number of combined color pixels, each made up of three unit pixels, are arranged in a row, the number of unit pixels can be reduced, allowing the intervals between the adjacent video signal lines to be increased.

This means that it is possible to suppress the noise field of an electric field produced by the video signal line 3, which enters into the area between the counter electrode and the pixel electrode, thus suppressing the cause of the smear (vertical smear).

The reduction in the number of video signal lines 3 reduces the capacitances produced at the intersections between the row-direction extending counter signal lines 4 and the video signal lines 3, with the interlayer insulating film interposed between these lines. This in turn reduces the dullness of voltage waveforms of the counter signal line from the voltage supply end toward the other end, thus suppressing the smear (horizontal smear).

Therefore, it is possible to provide a color liquid crystal display device that can reduce the smear significantly.

Embodiment 2

Figure 8:
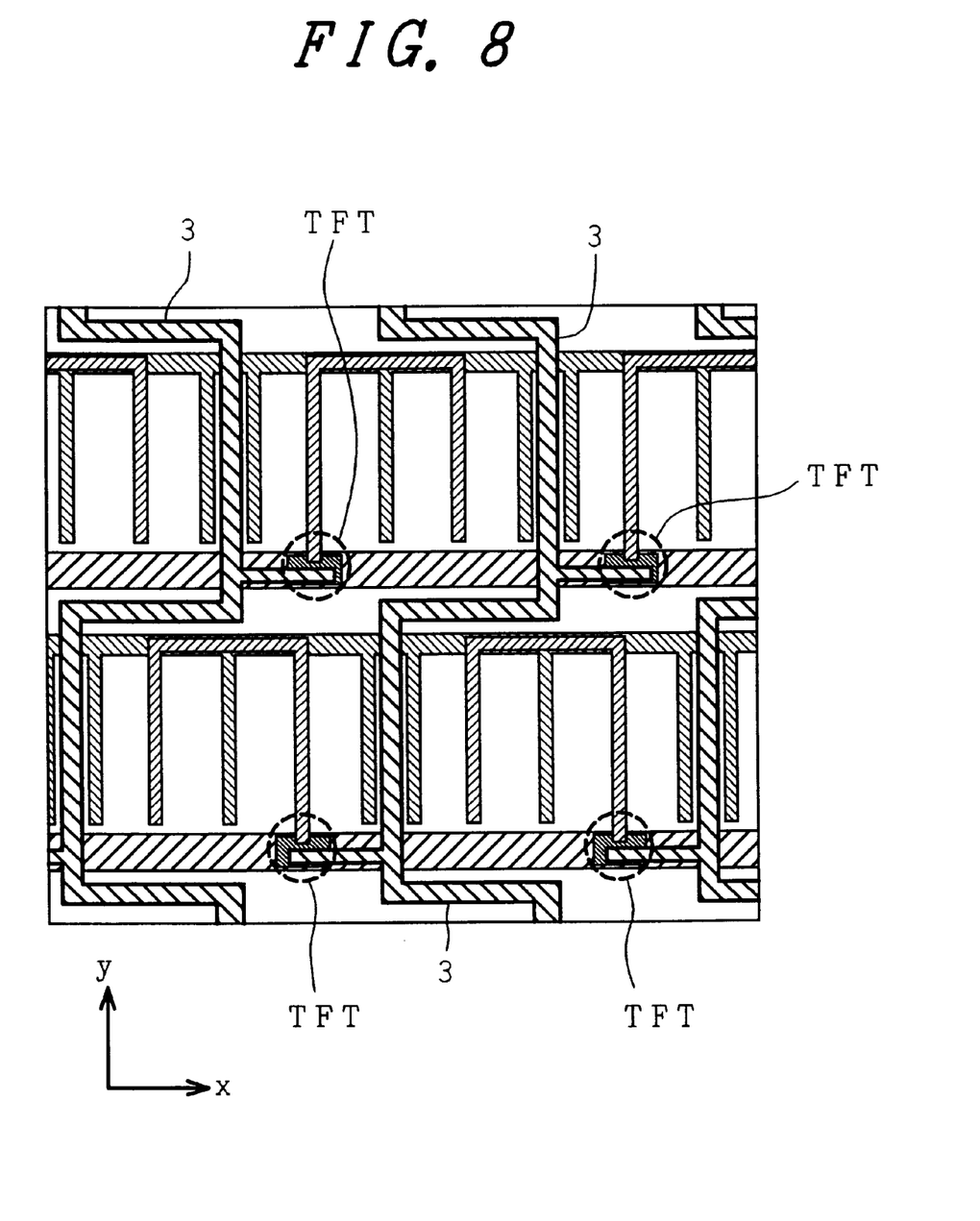
FIG. 8 is a plan view showing an essential portion of another embodiment of the liquid crystal display device according to this invention.

FIG. 8 corresponds to FIG. 1 and the members have the same functions as those of FIG. 1 with like reference numbers.

What differs from the configuration of FIG. 1 is that the unit pixels arrayed in the y direction and connected to the video signal line 3 through the thin film transistors TFT are arranged on each side of the video signal line 3 alternately.

While the configuration of FIG. 1 requires video signals of different colors to be supplied to a single video signal line, this configuration makes it possible to supply the video signals of the same color at all times.

This simplifies the configuration of the controller 9, offering the advantage of reducing the cost of members in addition to the advantages of the Embodiment 1.

Figure 9:
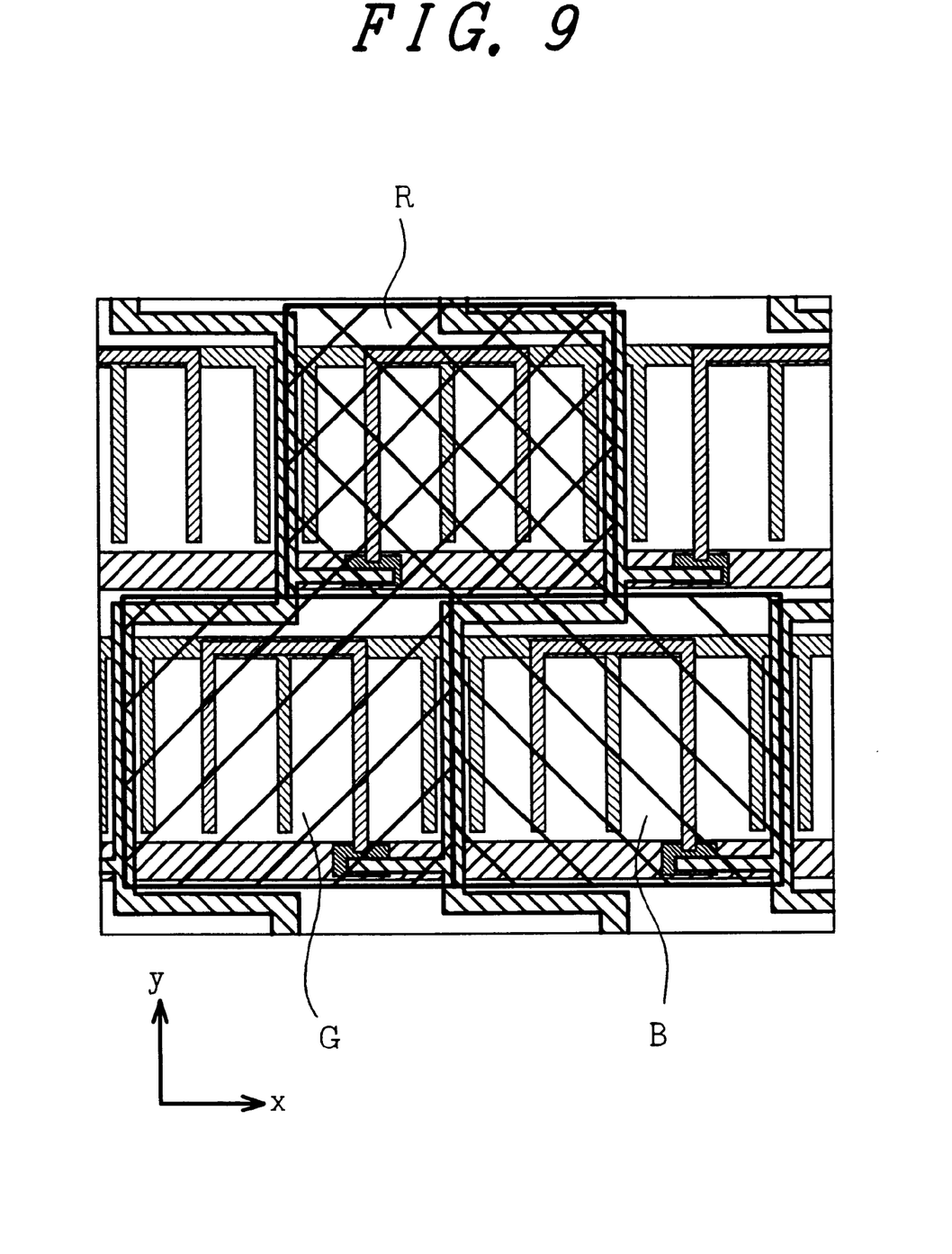
FIG. 9 is an explanatory diagram showing the arrangement of three unit pixels that together constitute a single combined color pixel in the configuration of FIG. 8.

In this case also, as shown in FIG. 9 which corresponds to FIG. 8, three adjoining unit pixels are selected from adjacent groups, arranged in the x direction, of the y-direction arrayed unit pixels so that they straddle these groups. The selected three adjoining unit pixels are provided with red (R), green (G) and blue (B) color filters respectively.

Embodiment 3

Figure 10A:
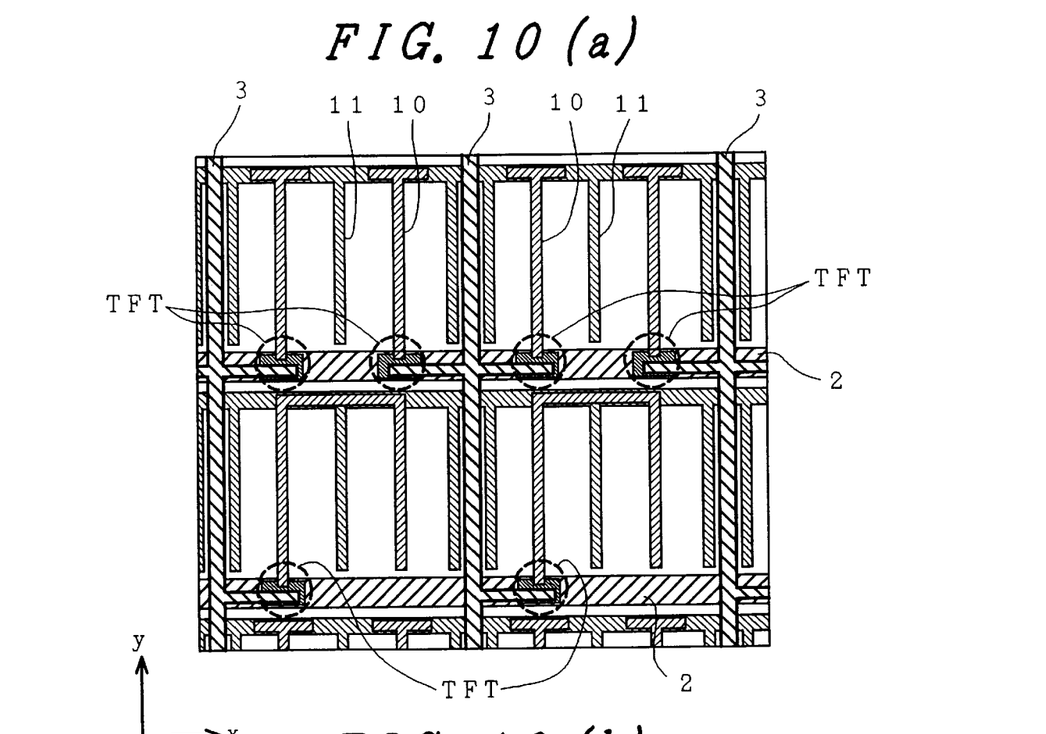
FIGS. 10(a)–(b) are a plan view showing an essential portion of still another embodiment of the liquid crystal display device according to this invention.

FIG. 10 corresponds to FIG. 1 and the members having identical reference numbers with those of FIG. 1 have the same functions.

The point in which this embodiment differs from the configuration of FIG. 1 is the video signal line 3. The vide signal line is formed linear and the column-direction arrayed unit pixels that are commonly connected to the associated video signal line are successively positioned at the center of and on one side of the video signal line alternately.

In this case too, the x-direction arrayed unit pixel groups are staggered one-half pitch of the unit pixels from the adjacent groups.

Hence, the unit pixels through the center of which the video signal line 3 runs have each formed on both sides of the video signal line a pixel electrode 10 to which a video signal is supplied through a thin film transistor TFT and a counter electrode 11 for generating an electric field between it and the pixel electrode 10.

Figure 10B:
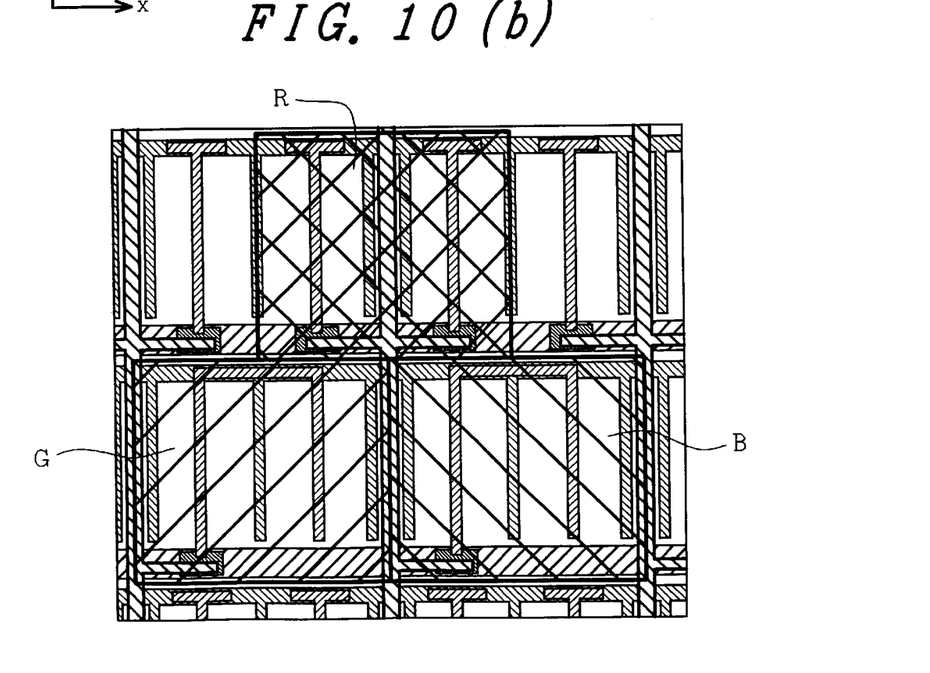

With this configuration, as shown at (b) of the figure that corresponds to (a), it is possible to put the unit pixels that make up a combined color pixel (shaded with diagonal lines) in the arrangement of FIG. 1 even when the video signal line 3 is formed linear.

Because the interval between the counter signal line 4 and the scan signal line located on the +y direction side of the counter signal line can be reduced, this embodiment has the advantage of improving the aperture ratio in addition to the advantages of the Embodiment 1.

Figure 11:
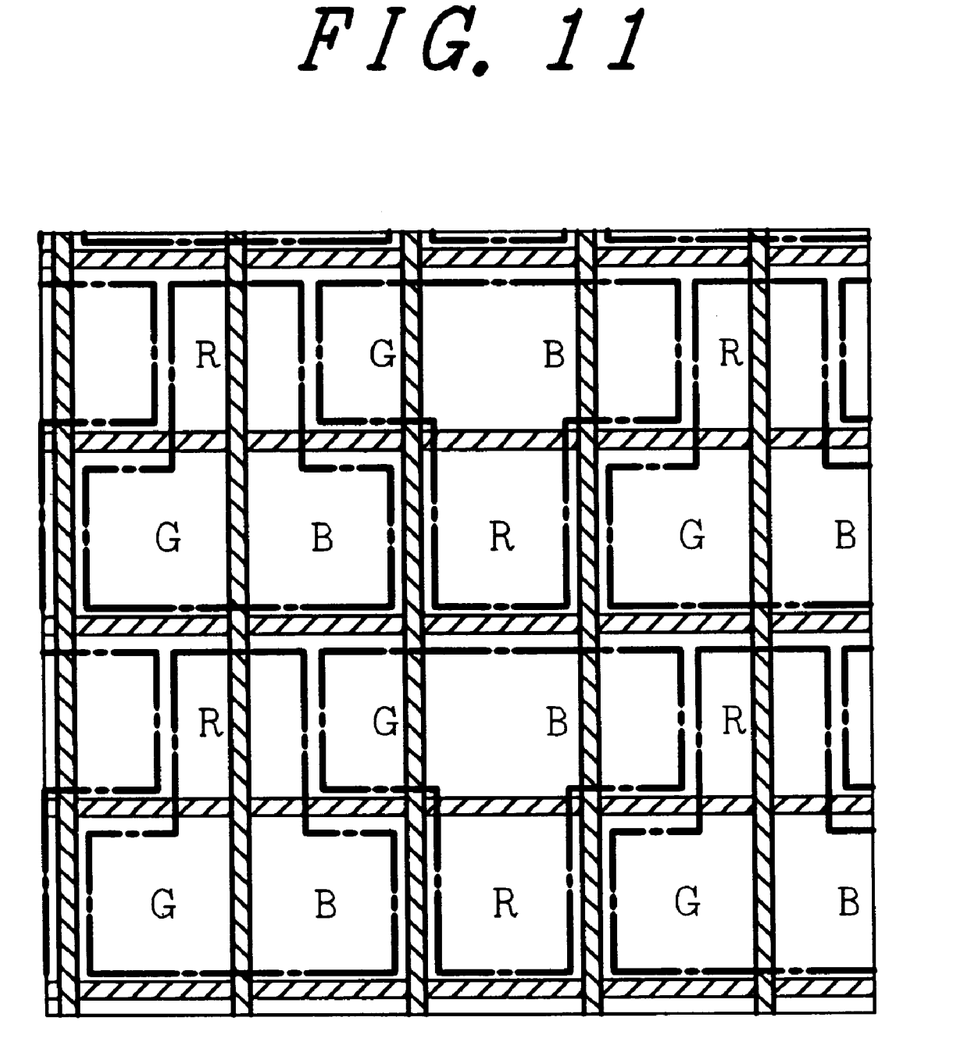
FIG. 11 is an explanatory diagram showing the arrangement of color filters in the configuration of FIG. 10.

FIG. 11 is an explanatory diagram showing the arrangement of color filters (R, G, B) of the unit pixels in the above configuration.

It is of course possible, in Embodiment 1, 2 and 3, to provide the counter signal lines 4 and the counter electrodes 11 on the liquid crystal side surface of the transparent substrate 1B. In this case, the auxiliary capacitance functions as an added capacitance produced between the pixel electrode 10 and the previous scan signal line 2 with the insulating film 18 working as a dielectric.

As can be seen from the above description, the present invention can provide a color liquid crystal display device that can reduce smear significantly.

Also, this invention is applicable for an in-plane field type device without color filter for displaying a black and white image.

What is claimed is:

1. A liquid crystal display device comprising opposing two substrates, at least one which is transparent, a liquid crystal layer interposed therebetween, a pixel electrode and a counter electrode formed on at least one of the two substrates in an area corresponding to each of unit pixels, scan signal lines each common to one group of row-direction arrayed unit pixels, switching devices turned on by a scan signal supplied to the associated scan signal line, video signal lines each common to one group of column-direction arrayed unit pixels and used to supply a video signal to the associated pixel electrodes, and counter signal lines each common to one group of row-direction arrayed unit pixels and used to apply a counter voltage to the associated counter electrodes;

wherein a light transmittance of the liquid crystal layer is changed by an electric field generated between pixel electrode and the counter electrode, the electric field having components almost parallel to the transparent substrate surface;

wherein the two groups of row-direction arrayed unit pixels are each staggered one half-pitch of the unit pixels from the adjacent groups;

wherein the scan signal lines are formed linear and the video signal lines extend in a zigzag and are located on one side of each group of column-direction arrayed unit pixels, each video signal line being common for one group of column-direction arrayed unit pixels; and wherein the column-direction arrayed unit pixels connected through thin film transistors to the associated video signal line are arranged on each side of the video signal line alternately.

2. A liquid crystal display device according to claim 1, wherein said counter signal lines are formed linear and cross said video signal lines with an interlayer insulation film interposed therebetween.

3. A liquid crystal display device comprising opposing two substrates, at least one which is transparent, a liquid crystal layer interposed therebetween, a pixel electrode and a counter electrode formed on at least one of the two substrates in an area corresponding to each of unit pixels, scan signal lines each common to one group of row-direction arrayed unit pixels, switching devices turned on by a scan signal supplied to the associated scan signal line, video signal lines each common to one group of column-direction arrayed unit pixels and used to supply a video signal to the associated pixel electrodes, and counter signal lines each common to one group of row-direction arrayed unit pixels and used to apply a counter voltage to the associated counter electrodes;

wherein a light transmittance of the liquid crystal layer is changed by an electric field generated between pixel electrode and the counter electrode, the electric field having components almost parallel to the transparent substrate surface;

wherein the two groups of row-direction arrayed unit pixels are each staggered one half-pitch of the unit pixels from the adjacent groups; and wherein the scan signal lines are formed linear, and the video signal lines extend linearly in such a way that the column-direction arrayed unit pixels of each group are successively positioned at the center of and on one side of the video signal line alternately, each video signal line being common for one group of column-direction arrayed units pixels.

4. A liquid crystal display device according to claim 3, wherein said counter signal lines are formed linear and cross said video signal lines with an interlayer insulation film interposed therebetween.

* * * * *